(12) United States Patent
Boivie et al.

(10) Patent No.: US 10,628,579 B2
(45) Date of Patent: Apr. 21, 2020

(54) SYSTEM AND METHOD FOR SUPPORTING SECURE OBJECTS USING A MEMORY ACCESS CONTROL MONITOR

(71) Applicant: International Business Machines Corporation, Armonk, NY (US)

(72) Inventors: Richard Harold Boivie, Monroe, CT (US); Kattamuri Ekanadham, Mohegan Lake, NY (US); Kenneth Alan Goldman, Norwalk, CT (US); William Eric Hall, Clinton, CT (US); Guerney Douglass Holloway Hunt, Yorktown Heights, NY (US); Bhushan Pradip Jain, Jalgaon (IN); Mohit Kapur, Sleepy Hollow, NY (US); Dimitrios Pendarakis, Westport, CT (US); David Robert Safford, Brewster, NY (US); Peter Anthony Sandon, Essex Junction, VT (US); Enriquillo Valdez, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/839,691

(22) Filed: Aug. 28, 2015

(65) Prior Publication Data
US 2016/0171250 A1 Jun. 16, 2016

Related U.S. Application Data

(60) Provisional application No. 62/092,062, filed on Dec. 15, 2014.

(51) Int. Cl.
*G06F 21/53* (2013.01)
*G06F 21/62* (2013.01)

(52) U.S. Cl.
CPC .......... *G06F 21/53* (2013.01); *G06F 21/6209* (2013.01)

(58) Field of Classification Search
CPC .................................................. G06F 21/6209
See application file for complete search history.

(56) References Cited

U.S. PATENT DOCUMENTS

| 5,757,919 A | 5/1998 | Herbert et al. |
| 8,108,641 B2 | 1/2012 | Goss et al. |
| (Continued) | | |

FOREIGN PATENT DOCUMENTS

| CN | 101465727 A | 6/2009 |
| JP | 2001-508893 A | 7/2001 |
| (Continued) | | |

OTHER PUBLICATIONS

International Search Report in International Application PCT/IB2015/059549 dated May 4, 2016.
(Continued)

*Primary Examiner* — Khoi V Le
(74) *Attorney, Agent, or Firm* — Jeffrey S. LaBaw, Esq.; McGinn IP Law Group, PLLC

(57) ABSTRACT

A processor in a computer system, the processor including a mechanism supporting a Secure Object that comprises information that is protected so that other software on said computer system cannot access or undetectably tamper with said information, thereby protecting both a confidentiality and an integrity of the Secure Object information while making the Secure Object information available to the Secure Object itself during execution of the Secure Object. The mechanism includes a crypto mechanism that decrypts and integrity-checks Secure Object information as said Secure Object information moves into the computer system from an external storage system, and encrypts and updates (Continued)

an integrity value for Secure Object information as said Secure Object information moves out of the computer system to the external storage system, and a memory protection mechanism that protects the confidentiality and integrity of Secure Object information when that information is in the memory of the computer system.

10 Claims, 8 Drawing Sheets

(56) References Cited

U.S. PATENT DOCUMENTS

| | | | | |
|---|---|---|---|---|
| 8,245,026 | B1* | 8/2012 | Moore | G06F 21/78 713/2 |
| 8,578,175 | B2* | 11/2013 | Boivie | G06F 21/57 713/189 |
| 8,738,932 | B2 | 5/2014 | Lee et al. | |
| 8,819,446 | B2 | 8/2014 | Boivie | |
| 8,839,455 | B1 | 9/2014 | Tormasov | |
| 2007/0136576 | A1 | 6/2007 | Chambers et al. | |
| 2008/0086603 | A1* | 4/2008 | Lahtinen | G06F 12/0284 711/147 |
| 2009/0216974 | A1* | 8/2009 | Morishima | G06F 9/4856 711/162 |
| 2010/0169948 | A1* | 7/2010 | Budko | G06F 21/53 726/1 |
| 2010/0332850 | A1* | 12/2010 | Boivie | G06F 21/125 713/189 |
| 2012/0216051 | A1* | 8/2012 | Boivie | G06F 21/6209 713/190 |
| 2013/0061058 | A1* | 3/2013 | Boivie | G06F 21/74 713/189 |
| 2014/0093084 | A1* | 4/2014 | De Atley | H04L 9/0861 380/277 |

FOREIGN PATENT DOCUMENTS

| | | |
|---|---|---|
| JP | 4140863 B2 | 6/2008 |
| JP | 2009-518742 A | 5/2009 |
| JP | 2011-181107 A | 9/2011 |

OTHER PUBLICATIONS

Written Opinion of the International Searching Authority in International Application PCT/IB2015/059549 dated May 4, 2016.

Software Patent Institute et al.; "An Overview of Virtual Machine Security Features"; An IP.com Prior Art Database Technical Disclosure; http://ip.com/IPCOM/000148883; Mar. 30, 2007.

Internet Society RFCS et al.; "Use Cases and Requirements for JSON Object Signing and Encryption (JOSE)"; An IP.com Prior Art Database Technical Disclosure; http://ip.com/IPCOM/000236247; Apr. 16, 2014.

Internet Society RFCS et al.; "Fcast: Object Delivery for the Asynchronous Layered Coding (ALC) and NACK-Oriented Reliable Multicast (NORM) Protocols"; An IP.com Prior Art Database Technical Disclosure; http://ip.com/IPCOM/000228843; Jul. 10, 2013.

A Partial English translation of Japanese Office Action dated Apr. 9, 2019.

Isaku Yamahata, "Detailed explanation•Latest virtualization technology of KVM", pp. 126-132, No. 11, vol. 12, Nikkei Linux,Nikkei Business Publications,Inc. Oct. 8, 2010 (with partial translation in Japanese Office Action).

Etsuji Nakai,"Linux container, latest tools, Docker technology", pp. 139-144, No. 10, vol. 16, Nikkei Linux, Nikkei Business Publications,Inc. Sep. 8, 2014. (with partial translation in Japanese Office Action).

A Partial English translation of Japanese Office Action dated Jul. 31, 2019.

Etsuji Nakai,"Linux container, latest tools, Docker technology", pp. 139-144, No. 10, vol. 16, Nikkei Linux, Nikkei Business Publications, Inc.

Isaku Yamahata, "Detailed Explanation • Latest virtualization technology of KVM", pp. 126-132, No. 11, vol. 12,Nikkei Linux, Nikkei Business Publications, Inc.

\* cited by examiner

SYSTEM AND METHOD FOR SUPPORTING SECURE OBJECTS USING A MEMORY ACCESS CONTROL MONITOR

CROSS REFERENCE TO RELATED APPLICATIONS

The present application claims priority, makes reference to, incorporates the same herein, and claims all benefits accruing under 35 U.S.C. § 119 from a provisional patent application for MECHANISM FOR SUPPORTING SECURE OBJECTS WITHOUT ENCRYPTING MEMORY, earlier filed in the United States Patent Office on Dec. 15, 2014 and there duly assigned U.S. Patent Application No. 62/092,062, the entire disclosure of which is hereby incorporated by reference in its entirety.

The present application also relates to security on a computer system in which the information in a given software module (a 'Secure Object') is protected from other software on the system. The present application is related to the following patent applications all of which are incorporated herein by reference: U.S. patent application Ser. No. 12/492,738, filed on Jun. 26, 2009, to Richard H. Boivie, entitled "Support for Secure Objects in a Computer System", now issued as U.S. Pat. No. 8,819,446, U.S. patent application Ser. No. 12/878,696, filed on Sep. 9, 2010, to Richard H. Boivie, entitled "Cache Structure for a Computer System Providing Support for Secure Objects", U.S. patent application Ser. No. 13/033,367, filed on Feb. 23, 2011, to Boivie and Williams, entitled "Secure Object Having Protected Region, Integrity Tree and Unprotected Region", now issued as U.S. Pat. No. 8,578,175, U.S. patent application Ser. No. 13/033,455, filed on Feb. 23, 2011, to Boivie and Williams, entitled "Building and Distributing Secure Object Software", now issued as U.S. Pat. No. 8,954,752, and U.S. patent application Ser. No. 13/226,079, filed on Sep. 6, 2011, to Boivie and Pendarakis, entitled "Protecting Application Programs from Malicious Software or Malware".

This invention was made with Government support under Contract No.: FA8750-12-2-0243 awarded by U.S. Air Force, Office of Scientific Research. The Government has certain rights in this invention.

BACKGROUND OF THE INVENTION

Field of the Invention

The disclosed invention relates generally to an embodiment of Secure Objects without encrypted memory, and more particularly, but not by way of limitation, relating to a use of Secure Objects to protect virtual machines in a system that supports the concurrent execution of multiple virtual machines, and to the use of Secure Objects to protect individual applications in a virtual machine from other software including the other software in the virtual machine.

Description of the Related Art

The first patent application listed above introduced the concept of a 'Secure Object' comprising code and data for a computer system that is cryptographically protected from the other software on the system, and a computer architecture for supporting such Secure Objects. The other patent applications listed introduced additional structures and mechanisms to protect the confidentiality and integrity of Secure Objects from other software including 'malware' that an attacker may be able to introduce into a targeted computer system.

The present invention provides support for Secure Objects in a way that does not require encryption or decryption every time data moves between a CPU and an external memory and thus provides support for Secure Objects in a way that is more efficient and that can provide higher performance.

SUMMARY OF INVENTION

In view of the foregoing and other problems, disadvantages, and drawbacks of the aforementioned background art, an exemplary aspect of the disclosed invention provides a new system and method of providing support for Secure Objects.

One aspect of the present invention provides a processor in a computer system, said processor comprising a mechanism supporting a Secure Object that comprises information that is protected so that other software on said computer system cannot access or undetectably tamper with said information, thereby protecting both a confidentiality and an integrity of the Secure Object information while making the Secure Object information available to the Secure Object itself during execution of the Secure Object, wherein said mechanism includes a crypto mechanism that decrypts and integrity-checks Secure Object information as said Secure Object information moves into the computer system from an external storage system, and encrypts and updates an integrity value for Secure Object information as said Secure Object information moves out of the computer system to the external storage system, and a memory protection mechanism that protects the confidentiality and integrity of Secure Object information when that information is in the memory of the computer system.

Another example aspect of the disclosed invention is to provide a method for protecting the confidentiality and integrity of a Secure Object running on a computer system by protecting the memory pages owned by the Secure Object by steps of assigning a Secure Object an ID, labeling the memory pages owned by a Secure Object with the ID of the Secure Object, maintaining an Access Control Monitor (ACM) table for the memory pages on the system, controlling access to memory pages by monitoring load and store instructions and comparing information in the ACM table with the ID of the software that is executing these instructions, and limiting access to a memory page to the owner of the memory page.

Yet another example aspect of the disclosed invention is to provide a method to protect the confidentiality and integrity of a Secure Object running on a CPU by protecting the CPU state of a Secure Object when other software such as an operating system or a device handler interrupts the execution of a Secure Object, wherein an Access Control Monitor securely saves the CPU state of the Secure Object before the interrupting software executes thereby protecting the CPU state of a Secure Object from other software.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF PREFERRED EMBODIMENTS

Figure 1:
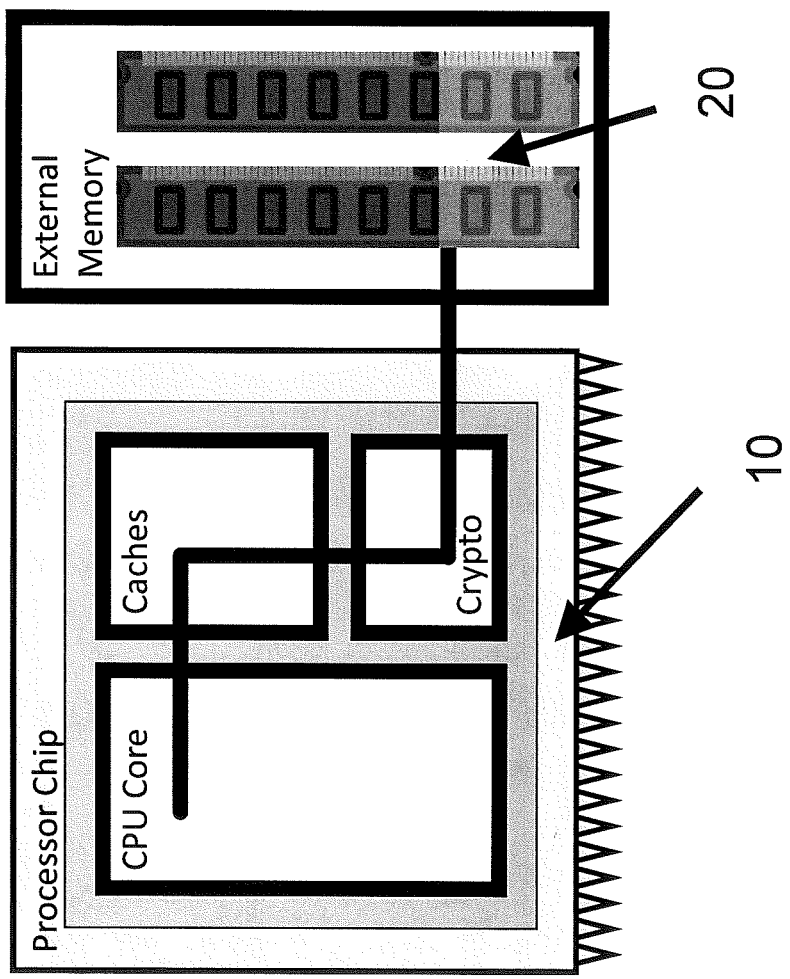
FIG. 1 illustrates the cryptographic protection of information in a Secure Object in the related applications.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Supporting Secure Objects without Encrypting Memory

In the previous related patent applications illustrated in FIG. 1, a Secure Object's private information is cryptographically protected when it is outside the CPU (central processing unit) chip 10 and the cryptography protects both the confidentiality and integrity of this information from other software. The private information is "in the clear" when it is inside the CPU chip 10 in general purpose registers or in on-chip caches but the CPU ensures that other software does not have access to this private information. The CPU securely saves and restores the state of a Secure Object, including the contents of general purpose registers, on an interrupt or context switch and the CPU keeps track of the software that "owns" a given on-chip cache line and prevents 'other software' from accessing private information in an on-chip cache line.

The present application relates to a variation in the design that provides similar protections. As in the prior patent applications, the current invention protects the confidentiality and integrity of a Secure Object's private information from other software including privileged software like an operating system, device drivers or privileged applications—or malware that "infects" privileged software and inherits root privilege. But the present invention does this in a way that has less performance overhead and less space overhead.

In the original Secure Object design, a Secure Object's private information is only in the clear when it is inside the CPU chip.

Figure 2:
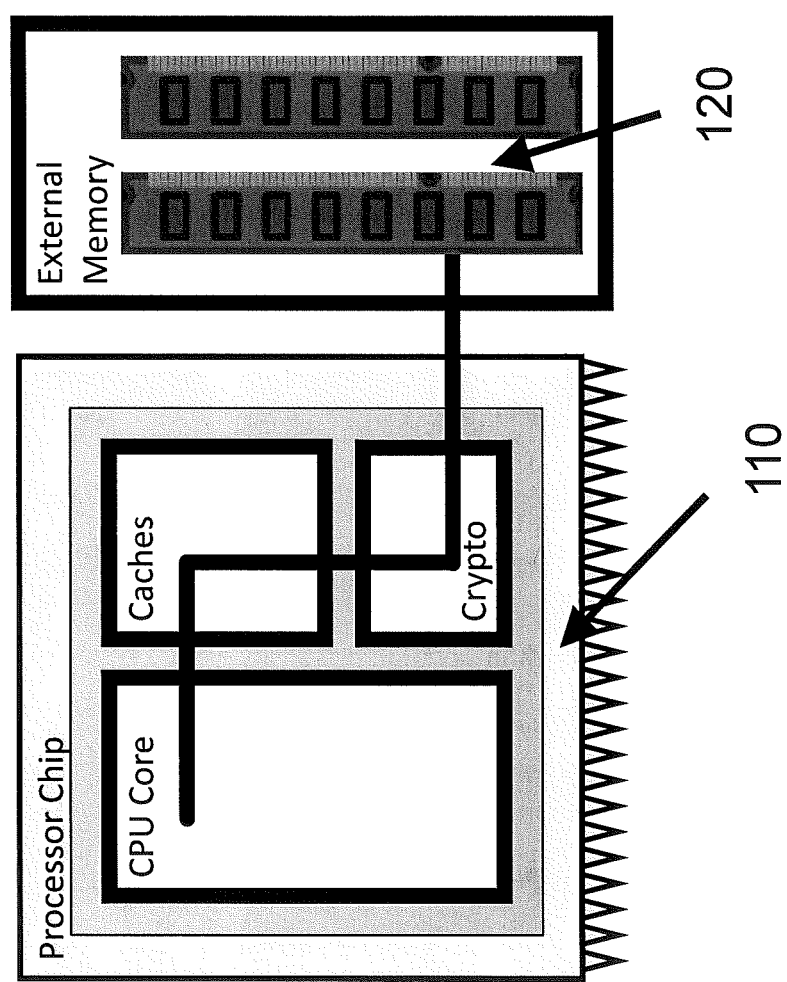
FIG. 2 is used in the discussion of Secure Object protection in the current invention.

In the modified design of the current application, a Secure Object's private information is in the clear when it is in the CPU chip 110 and when it is in system memory 120 as illustrated in FIG. 2, and an Access Control Monitor (ACM) protects in-memory private information from other software. The ACM can be implemented completely in hardware, but those skilled in the art will recognize that portions of the ACM can also be implemented in microcode, firmware or software.

As in the prior related applications, a Secure Object consists of cryptographically protected information, integrity information and an 'esm instruction' that is used to enter secure mode. (Note that the 'esm instruction' could be an actual CPU instruction or it could be implemented as a call or software interrupt to ACM).

As in the prior related applications, the 'esm instruction' processes an operand to obtain some information about a Secure Object including the crypto key that protects the Secure Object's private information. The 'esm instruction' also assigns an ID (identity) to the Secure Object. As in the prior design, this ID is loaded into a CPU register that allows the CPU to label information to indicate the "owner" of that information.

As stated above, in the present invention a Secure Object's private information is in the clear in memory. This private information is encrypted when it is paged out to a paging device such as a disk and it is decrypted when it is paged in.

When a Secure Object generates a page fault, the encrypted page is paged-in and ACM will decrypt the page before the Secure Object resumes execution. When a page containing private information is to be paged out, ACM will encrypt the page before the page is written out to the paging device. (As discussed in the prior applications incorporated herein by reference, the key used for this encryption and decryption is not available to other software.)

With appropriate hardware support, ACM can perform this encryption and decryption in a way that is transparent to existing operating system software. In one embodiment, storage protection keys like those used on IBM System Z servers are used to label the pages of physical memory. In this case, the storage protection key for a page would contain the ID of the Secure Object that owns the page. As discussed above, the ID for a Secure Object would be assigned as part of an 'esm instruction'. When the operating system brings in a page from disk, the storage protection key for the page will contain the ID of the operating system. When a Secure Object first attempts to access a page after it has been paged in, the ID of the Secure Object will not match the ID of the memory page, and an "ownership-mismatch" interrupt will occur. ACM will handle this interrupt and change ownership of the page to the Secure Object and then decrypt the page and resume execution of the Secure Object. Later when the operating system attempts to page-out a page that is owned by a Secure Object, another ownership-mismatch interrupt will occur. In this case, ACM will catch the interrupt and encrypt the page and then change ownership of the page to the operating system and resume execution of the operating system. (Alternatively, if the operating system initiates a page out by starting a DMA to disk, the operating system could first tell ACM that it intends to swap the page out before starting the DMA so that ACM can encrypt the page without having to interrupt or suspend a DMA operation.)

Although the example embodiment described above uses storage protection keys to label memory pages, those skilled in the art will recognize that the invention can be practiced using other mechanisms, e.g. by adding ownership labels to page-table-entries (PTEs) and/or translation-lookaside-buffers (TLBs) in a processor's address translation hardware.

As mentioned previously, the invention discussed in the present patent application provides similar protections to the previously disclosed Secure Object patent applications, but with several advantages. The performance overhead in the current invention is less since crypto and integrity processing is only done when pages of information move between memory and a storage device. In the earlier design, crypto and integrity processing are done whenever a cache line moves between the CPU and external memory. In addition, space overhead is significantly less in the current invention since the design requires only one integrity value per memory page (e.g. 1 value per 4K bytes) rather than the one integrity value per cache line (which might be 128 bytes or 64 bytes or some other relatively small number of bytes depending on the particular CPU architecture) as discussed in the prior applications.

Figure 3:
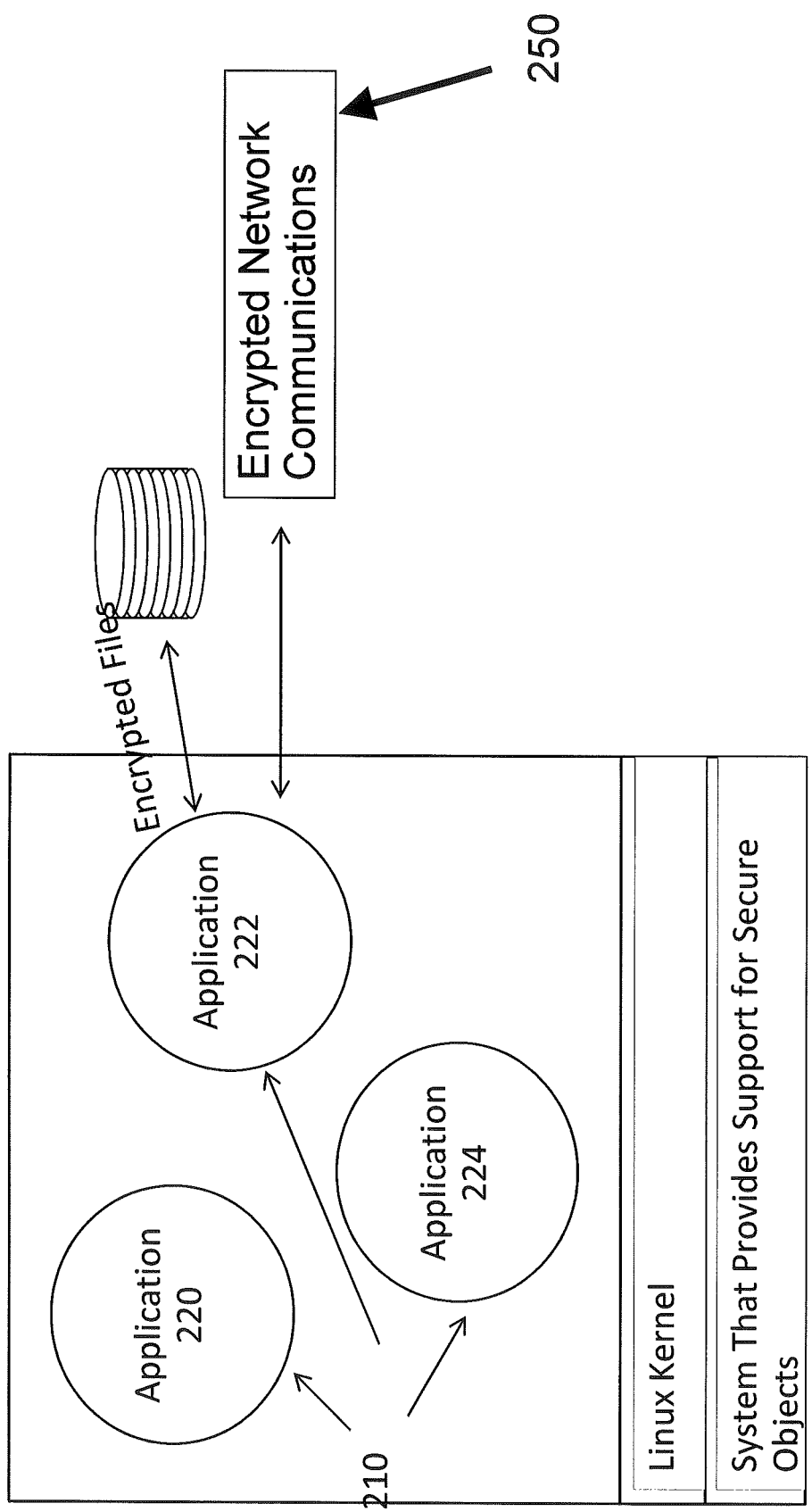
FIG. 3 illustrates how Secure Objects can be used to provide end-to-end security for application software.
Figure 4:
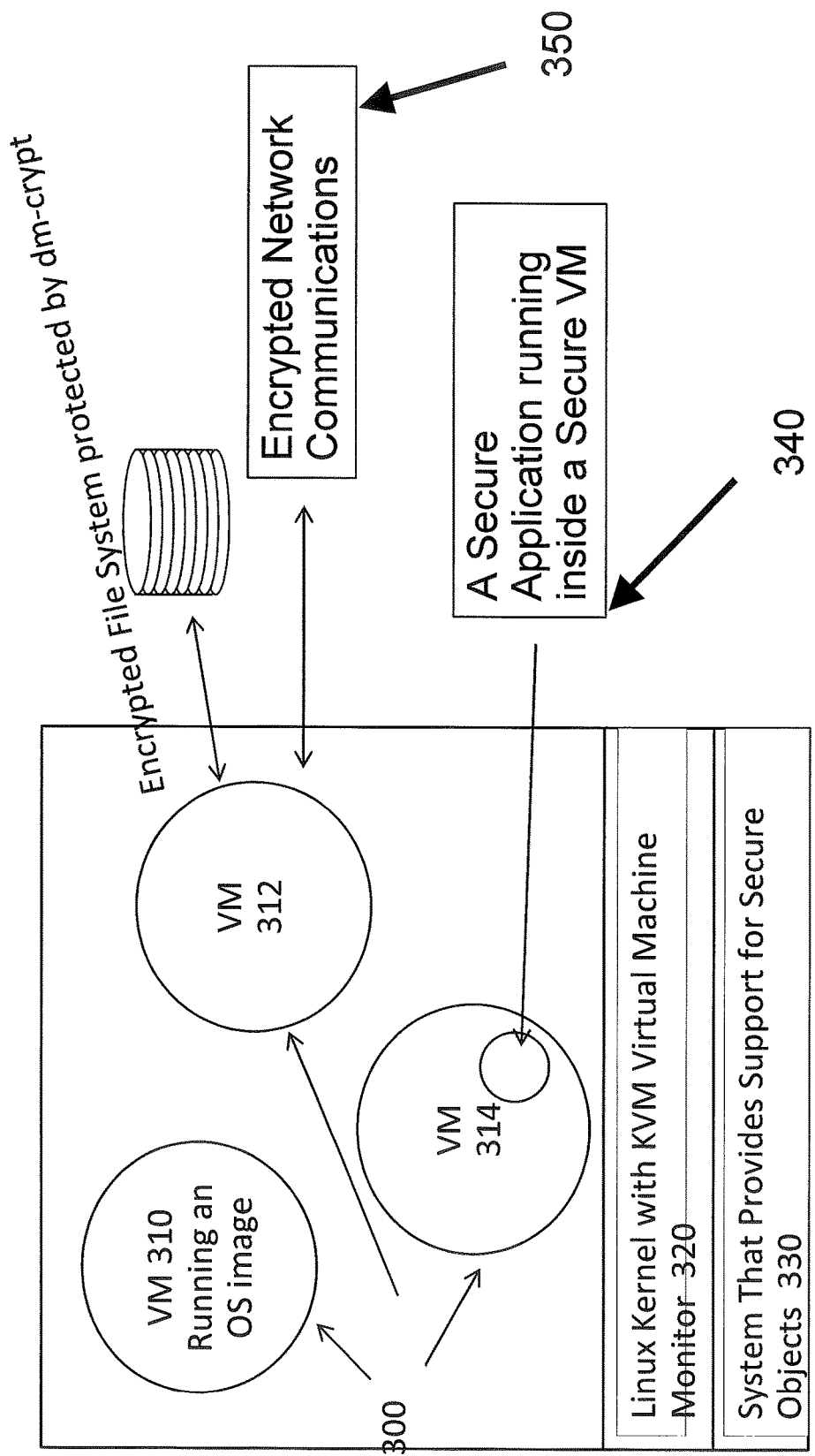
FIG. 4 illustrates how Secure Objects can be used to provide end-to-end security for Virtual Machines and for applications within Virtual Machines.

Using Secure Objects to Protect Virtual Machines & Applications within Virtual Machines As discussed in the prior related patent applications and illustrated in FIG. 3, Secure Objects 210 can be used to protect individual applications 220, 222, 224 from the other software on a system. As illustrated in FIG. 4, Secure Objects 300 can also be used to protect Virtual Machines 310, 312, and 314 in a system that supports the concurrent execution of multiple Virtual Machines 330. This would be useful in a Cloud Computing environment, for example, to protect a customer's Virtual Machine from the Cloud Service Provider's software as well as from the Virtual Machines of other customers. Secure Objects 300 can also be used to protect individual applications in a Virtual Machine from the other software within the virtual machine.

In one embodiment, Secure Objects 300 can be used to protect Virtual Machines in a Linux/KVM environment 320. KVM (Kernel-based Virtual Machine) is a Linux subsystem that adds a Virtual Machine Monitor (or hypervisor) to a Linux system 320. In a Linux/KVM system, Virtual Machines are implemented as regular Linux processes so these Virtual Machines can be protected the way that ordinary applications are protected in the current or prior applications. A Virtual Machine can be made into a Secure Virtual Machine (or SVM) similar to the way an application is made into a Secure Object in the prior applications. In one embodiment, an esm instruction is added at the beginning of the Virtual Machine's code (e.g. an OS image), wrappers are added for communications outside the Virtual Machine (similar to the wrappers described in the prior applications incorporated herein by reference) and the Virtual Machine is integrity-protected (and optionally encrypted) as discussed in the prior applications. The SVM can then be run on Linux/KVM on a CPU with the Secure Object support described in the current or prior applications. The Secure Object protection protects the information within the SVM but it is the responsibility of the SVM to protect information that goes outside the SVM such as packets sent to a remote system (using, for example, mechanisms such as Transport Layer Security (TLS) or IPsec) and data written to a file system (using a mechanism such as dm-crypt). Note that as in the prior applications, the Secure Object protection mechanism is responsible for securely saving and restoring the state of Secure Objects which, in this case, correspond to Secure Virtual Machines.

As discussed in one of the related patent applications (U.S. patent application Ser. No. 13/226,079) the Secure Object protection can be configured to protect both the confidentiality and integrity of information or just the integrity of information. As discussed in that application, different portions of a Secure Object can be protected differently. Secure Object protection can be configured to protect the integrity but not the confidentiality of the kernel code in a Secure Virtual Machine while protecting both the confidentiality and integrity of the other information in the SVM. This would allow a hypervisor such as Linux/KVM to perform 'Kernel Samepage Merging', for example, so that the same kernel code pages could be used for different virtual machines while still providing both confidentiality and integrity protection for the other information within these Virtual Machines.

Although the embodiment described here is for a Linux/KVM system, those skilled in the art will recognize that the invention can be practiced in other environments that support Virtual Machines.

Secure Object protection can also be used to protect individual applications in Secure or Ordinary/Non-Secure Virtual Machines. In either case, a Virtual Machine will have a file system and the file system can contain an application that has been built as a Secure Object. In one embodiment, the Secure Application has a cryptographically protected region, an esm instruction and system call wrappers and is built as a Secure Object as discussed in U.S. patent application Ser. No. 13/033,455 now U.S. Pat. No. 8,954,752. In this embodiment, the Secure Application will start like any other application in the (Secure or Non-Secure) Virtual Machine and then execute an esm instruction to enter secure mode. Execution of the Secure Application will proceed as discussed in the prior applications although in this case, the Secure Object support must also be aware of context switching within a Virtual Machine so that it can securely save and restore the state of a Secure Application when a context switch occurs.

In similar fashion, the Secure Object protection can be used to protect "containers" (such as Linux containers) that run in a Secure Virtual Machine, in an ordinary Non-Secure Virtual Machine or on an operating system running on "Bare Metal" hardware.

There are several instantiations of Linux containers, including LXC and Docker. While hypervisors provide virtualization at the hardware abstraction layer, containers provide virtualization at the operating system layer. Just as hypervisor guests run as if they were running on their own dedicated hardware, containers run as if they were running on their own dedicated operating system. Containers use kernel features including namespaces, cgroups and capabilities to give the appearance of a dedicated operating system kernel to each container. Containers are in some sense half way between single native applications and virtual machines running many applications. Secure Objects can be used to protect containers similar to the way Secure Objects are used to protect applications and virtual machines. A container image file can be protected similarly to a virtual machine image, with an esm used to decrypt the image key. The individual processes within the container can be protected as in the original description of application level protection. As in the case of Secure Applications and Secure VMs, the software in a Secure Container is responsible for securing information that goes outside the container. And as in the case of Secure Applications, system call wrappers could be used for calls to the operating system. If desired some system calls (e.g. file system primitives) can be incorporated in a 'library OS' that is inside a Secure Application or a Secure Container to minimize the overhead that might otherwise be required to protect information that goes outside or comes from outside the Secure Application or Secure Container on a system call.

The present disclosed invention also supports secure regions within an application. As discussed in one of the prior patent applications listed above (U.S. patent application Ser. No. 12/492,738, filed on Jun. 26, 2009, now U.S. Pat. No. 8,819,446) an application can use the esm and Ism instructions to protect particularly sensitive portions of an application from 'other software' including the other software within the application.

Access Control Monitor (ACM)

As discussed above, the current invention extends the prior applications in several ways.

The current invention supports the use of labels to protect memory pages.

The current invention also supports the sharing of data between Secure Objects using labels for the information to be shared. These labels can be applied to cache lines in an implementation in which cache lines are labeled as in the prior patent applications incorporated herein by reference, or to memory pages as discussed in more detail in the current application. A label, which we also refer to as a "color" designates a particular security domain $450_n$ (where n is an integer) and the information labeled by a given color is accessible by any software that includes that color in its "palette of colors". If a memory page is shared among multiple Secure Objects, the color of that memory page will appear in the palette of each of these Secure Objects. For example, $450_1$ is red and $450_2$ is green and $450_3$ is blue in color.

The disclosed invention also supports Secure Objects that are in other Secure Objects like a Secure Application or a Secure Container within a Secure Virtual Machine.

Figure 5:
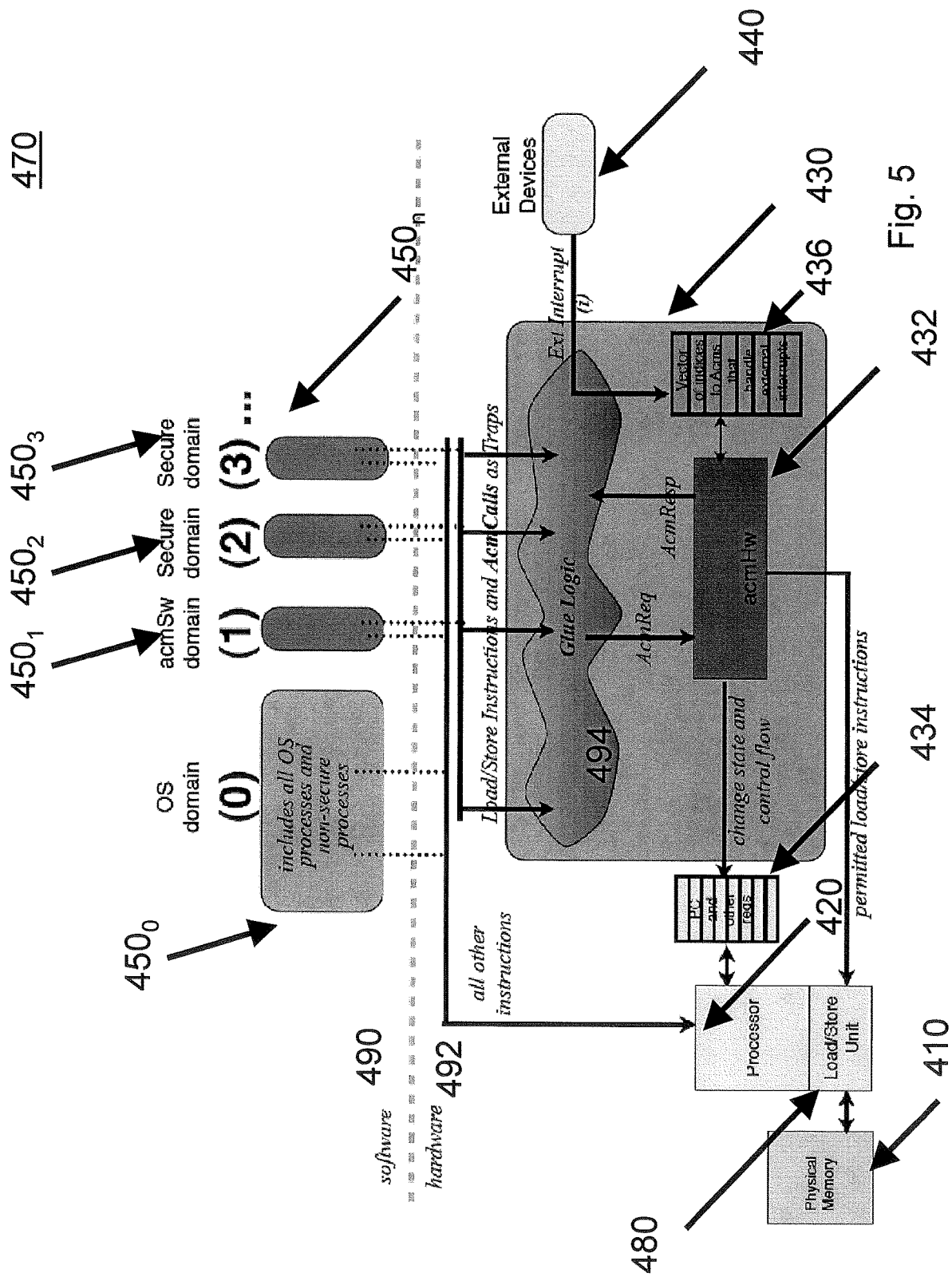
FIG. 5 illustrates an overview of an example embodiment of the Access Control Monitor (ACM).

One embodiment involves an Access Control Monitor (ACM) 470 that monitors and controls access to memory 410. An overview of the ACM 470 is illustrated in FIG. 5. At the bottom left, a processor 420 is shown along with its connections to registers 434 and to memory 410 via a load-store unit 480. The processor 420 can be a "conventional" processor. In the disclosed invention, the processor 420 is augmented with additional logic which we refer to as ACM Hardware (ACM-HW) 432. The ACM Hardware 432 intercepts load and store instructions and handles special ACM-Trap instructions. The ACM Hardware 432 performs some checking on load and store instructions and may perform some additional processing before passing the load and store instructions on to the load-store unit 480.

In FIG. 5, the software running on an ACM system 470 is shown as a collection of domains $450_n$ at the top of the figure. Each domain $450_n$ contains a collection of software modules that have the same security privileges. The first domain $450_0$ contains the OS (operating system) code as well as all the ordinary, non-secure processes running on the OS. (In another example, the first domain could contain a Hypervisor 512 (FIG. 6) as well as ordinary, non-secure virtual machines running on that hypervisor.) The second is a secure domain, ACM-SW $450_1$, which can perform some ACM functions in software. As stated previously, the ACM can be implemented in hardware or in some combination of hardware and software. The boundaries shown in FIG. 5 can be changed between hardware 432 and software $450_1$. "Complex functions" such as the encryption or decryption of memory pages or the generation or validation of integrity values might be implemented in the ACM-SW $450_1$. The other domains $450_2$ and $450_3$ are Secure Objects which can be Secure Applications or Secure Virtual Machines or Secure Containers. The role of the ACM, a combination of 432 and $450_1$ in FIG. 5 is to protect the confidentiality and integrity of information in each of these Secure Objects from all the other software on the system including the OS/Hypervisor.

The ACM-HW 432 is organized as a state machine that responds to requests and returns responses as shown in FIG. 5. The "cloud" 494 shown above the ACM-HW is "glue logic" 494 that translates various signals into ACM requests and returns appropriate ACM responses back to the processor 420.

The functions provided in one embodiment of ACM and the data structures that are used to implement this embodiment are described below.

In this embodiment, ACM-HW 432 maintains a catalogue of pages that are mapped by the OS that the ACM-HW 432 uses to enforce security constraints without having to deal with the details of the address translation mechanisms that are used by the CPU hardware 420. In another variant, the ACM-HW 432 manages the tables that are used by the CPU (Central Processing Unit) or processor 420 and the OS makes calls to the ACM-HW 432 to update these tables. From a security perspective, the two schemes are equivalent, the difference being the need for the ACM-HW 432 to track the changes made by the OS in one case and having to manage the hardware tables in the other.

The ACM-HW 432 can be a logic circuit or alternatively software stored in a non-transitory recording medium and executable by a processor.

Figure 6:
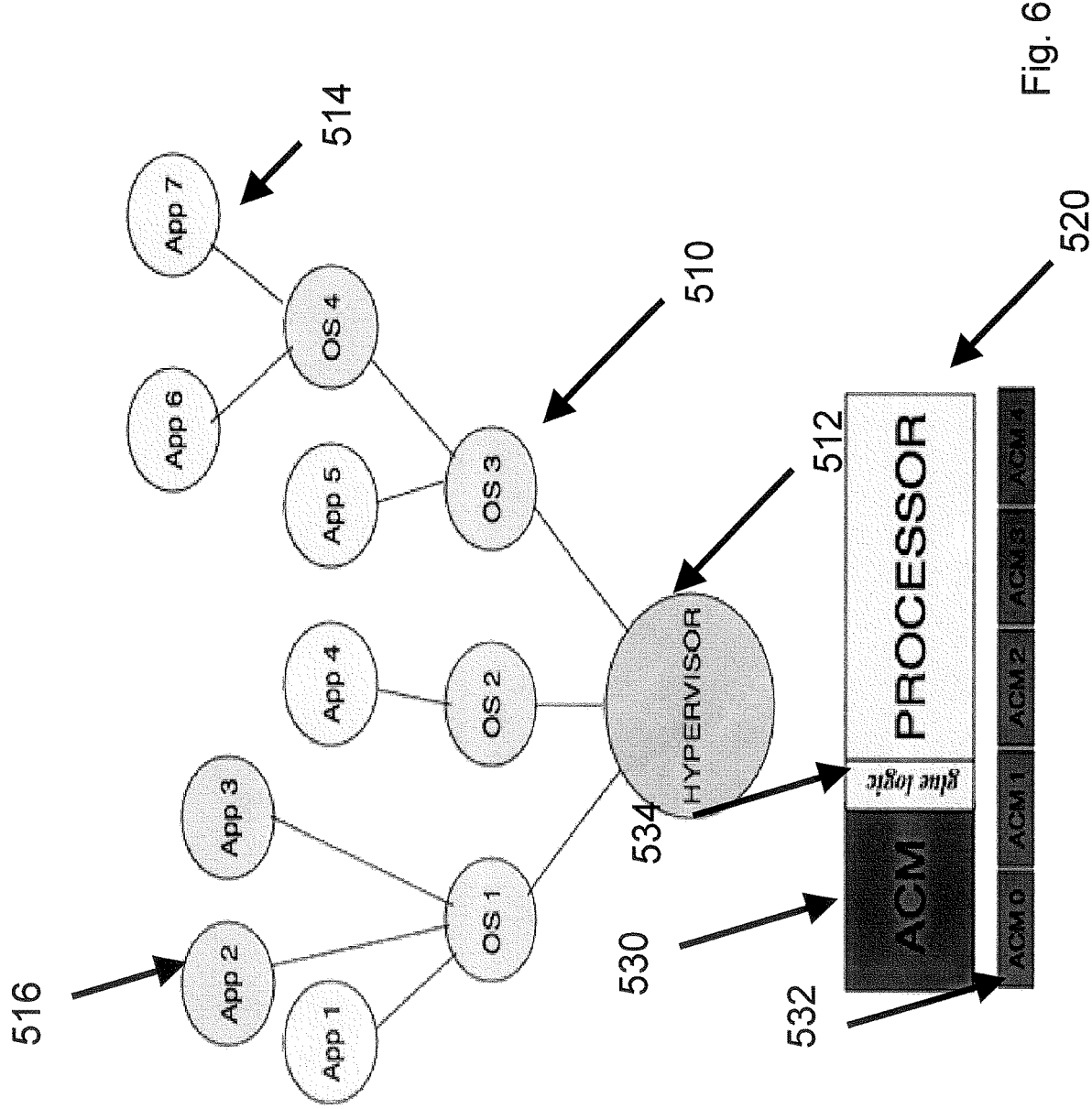
FIG. 6 illustrates a hierarchy of protection domains of an example embodiment

One of the functions provided in this embodiment creates a new ACM, e.g. ACM1 in FIG. 6. Using this primitive, one can create a hierarchy of protection domains as shown in FIG. 6. Each newly created ACM in FIG. 6, ACM1 through ACM4 in 532 has its own set of colors and manages its own set of domains. At any point in time, the processor 520 is executing on behalf of one domain, which is controlled by an associated ACM in 532. An interrupt vector keeps track of the ACM in 532 to which an interrupt should be directed. Initially all interrupts are owned by the original ACM, ACM0 in 532 but an ACM, ACM0-ACM4 in 532 can delegate interrupts to other domains. In one embodiment, an OS 510 calls NewDomain to create a new secure Domain with a new color.

For example, Application App 1 is green and App 2 is blue.

After creating a new secure domain, an OS, e.g. 510 can call NewACM using the domain that was just created as the target domain for a new ACM. The new ACM that is created, e.g. ACM in 532 is a virtual ACM that is connected to the ACM-HW 530 that is ultimately responsible for isolation, the virtual ACMs ACM1-ACM4 in 532 passing their requests recursively to the ACM-HW 530.

One embodiment of ACM 432 and $450_1$ in FIG. 5 uses the data structures listed below to provide the functions that are described below. Note that the values used for tables sizes and field widths (e.g. for colors) as well as other details of this embodiment are for purposes of illustration only. It is to be understood that the present invention is not limited to this precise embodiment and that various changes and modifications may be effected therein by one of ordinary skill in the pertinent art without departing from the scope or spirit of the present invention.

Data Structures:

1. Colors, Color Fields and Free Color Bit Vector (FCBV). A color corresponds to a Security Domain. The Free Color Bit Vector is a 1K bit-vector supporting up to 1024 colors. Initially it is all zeros. To allocate a new color, the first zero-bit is located and set to 1 to indicate that the color has been allocated. The index is converted to a 10-bit value that is used as the color field in other data structures. Each Secure Object 300 will have at least one color (its 'primary' color which is equal to its Secure Object ID). A Secure Object may also have additional colors for pages that are shared with other software. Finally one color will be used by all the software that is not part of any Secure Object. Memory pages will also have colors. The color of a private (non-shared) memory page is that of the current owner of the page.

2. Palettes: A palette is the set of colors that a Secure Object 300 has access to. It can be implemented as a 1K bit-vector. Each Secure Object 300 has a unique color for its private pages. It may also have additional colors for pages that it is willing to share with others and for pages that other Secure Objects 300 are willing to share with it. If an executing program attempts to access a page but doesn't have the color of that page in its palette, a color-mismatch (a generalization of an ownership-mismatch) interrupt will be generated. As discussed above, ACM 432 and 450$_1$ will handle this interrupt, change ownership (color) of the page and encrypt or decrypt the page as discussed previously.

3. State Table: A 1K entry table that securely stores the state of up to 1K Secure Objects. When a Secure Object 300 is interrupted, ACM 432 and 450$_1$ will securely save the state of the Secure Object 300 in an entry in this table before transferring control to an appropriate interrupt handler. The ith entry in the table is used for the Secure Object having ID (or primary color) i. A Secure Object will be securely resumed when the OS makes a 'resume' call to ACM and specifies the index of the Secure Object to be resumed. An entry in this table contains the following fields.

a. ST[i].pc. The program counter where the Secure Object 300 will resume execution
b. ST[i].state. The register state of the Secure Object 300.
c. ST[i].palette. The palette of the Secure Object 300.
d. ST[i].color. The primary color (i.e. the ID) of the Secure Object 4. Current State (CS) and Current Palette (CP) Registers. CS is a 10 bit register that contains the ID/primary color of the currently executing Secure Object. It is also used as an index into the State Table. CP is 1K bit-vector register that contains the palette of the currently executing Secure Object. This palette is compared to the color of a memory page during a memory access. If the color of the page is in the palette, access is allowed. Otherwise a color mismatch interrupt is generated.

5. Color fields added to Page Table Entries (PTEs) and TLB Entries (TLBEs). Each page table entry (PTE) and each TLB entry (TLBE) is extended with a 10-bit color field that is used to determine whether the color of a memory page that is being accessed is in the palette of the software that is currently executing.

6. Color Table (CT): A table with 1K entries, one for each color. An entry contains the following information for a color.

a. CT[i].key. An optional crypto key that when specified is used to encrypt or decrypt a page on a color-mismatch interrupt.
b. CT[i].handle. An optional handle that when specified indicates that a color is used for a shared page.
c. CT[i].class. An optional security class that indicates the security class of the owner of a shared page.
d. CT[i].rwxBits. An optional field that indicates the access rights the owner of a shared page has made available to others.

Base Functions:

Creation of a new secure object. When an application or a container or a Virtual Machine invokes an 'Enter Secure Mode' (esm) call, ACM 432 and 450$_1$.
a. creates a new entry in the State Table for the newly created Secure Object 300
b. allocates an ID/primary color for the new Secure Object 300
c. decrypts the operand of the esm 'instruction' using a System Key that is not available to other software to obtain certain information about the new Secure Object including the symmetric key that is used to decrypt the Secure Object 300. (The operand might be decrypted as discussed in U.S. Pat. No. 8,578,175 incorporated herein by reference.) The start-address for secure execution is also obtained from the decrypted operand.
d. Stores appropriate information in the FCBV, the State Table, the Color Table, the CS and the CP described above, and
e. resumes execution of the newly created Secure Object 300 in Secure Mode at the start address for secure execution referred to above.

Pre-processing of interrupts. If an interrupt occurs while a Secure Object 300 is running, ACM 432 and 450$_1$ will securely save the state of the Secure Object 300 in the State Table described above before transferring control to an appropriate interrupt handler.

Secure resume. When an OS 510 or a hypervisor 512 wants to resume a previously interrupted Secure Object 300, it makes a 'resume' call to its controlling ACM e.g. ACM1 in 532, which will securely restore the state and resume execution of the previously interrupted Secure Object.

Handling of Color-Mismatch Interrupts. A color-mismatch interrupt will be handled by ACM. If the interrupt occurred while non-secure software was running, ACM 530 will encrypt the page. If the interrupt occurred when a Secure Object 300, was running, ACM 530 will decrypt the page. The first case might be called an "encrypt for pageout" interrupt. This "encrypt for pageout" ACM 530 code could also be called directly from an OS 510 or a hypervisor 512 so that ACM 530 doesn't have to jump-in in the middle of a DMA operation as discussed above. The second case might be called a "decrypt for secure execution" interrupt.

Additional Functions for Secure Sharing of Memory Segments

Linux systems and other systems support shared memory between different applications. ACM complements this by supporting shared memory segments that are protected from the other software on a system including operating system and hypervisor software.

A Secure Object can create a new color and a new crypto key for a memory segment that it wants to share and then share this new color with one or more parties. Sharing is accomplished through the use of a handle that can be passed between cooperating parties. The owner of a memory segment can ask ACM to create a handle for the memory segment and ACM will allocate a new color and a new crypto key for the memory segment. ACM will then add the new color to the owner's palette and return a handle for the memory segment to the owner that the owner can then share with other parties. Another party can then present the handle to ACM which will then add the associated color to its palette. The memory pages associated with this color will then be accessible by the owner and the parties that the owner has shared the handle with. And these memory pages will not be accessible by any other software. To ensure security, a handle will be hard-to-guess, like a random string of 128 bits, or a random string of 256 bits, say. (In an alternate design, the owner of the shared memory segment could create the handle for the segment.)

An owner of a memory segment can also specify the kind of access that another party can have to the segment. It does this when requesting a handle by specifying the access rights that it wants to make available to other Secure Objects (e.g. via a set of rwx bits to give other parties permission to read, write or execute instructions from the shared segment respectively).

Sharing with Mandatory Access Controls

ACM also supports Mandatory Access Controls among a set of security classes. A Secure Object is assigned to a security class at startup based on information in its esm operand. ACM uses a square Constraint Matrix (CM) to enforce Mandatory Access Controls among classes. CM contains one row for each security class as well as one column for each class. An entry CM[i, j] indicates, e.g. via rwx bits, whether a Secure Object of class i can give another Secure Object of class j read, write or execute permission to a memory segment owned by class i. This constraint matrix can be 'hard coded' into ACM or supplied via a standard security mechanism such as a digital signature, via a secure transport protocol or via another security mechanism known to those skilled in the art. (Note that the class of a Secure Object can be a 'Universal Access Class' as defined in IBM Research Report RC 21673, Multi-Organizational Mandatory Access Controls for Commercial Applications, Paul Karger, Feb. 22, 2000; and IBM Research Report 21717, A New Mandatory Security Policy Combining Secrecy and Integrity, Paul Karger, Vernon Austel and David Toll, Mar. 15, 2000.)

ACM Primitives in One Embodiment

The functionality described above can be provided via the following ACM primitives.

1. NewAcm r, c constraints: can be issued only by an OS domain (except at the very beginning); r is a valid mapped page accessible to the current domain; c is a valid color of a secure domain, which is being changed to a new acm.

actions: r is read, measured, decrypted and installed as the acmSw code for this new acm; default domains OsDomain (0) and acmSw(1) are established for this acm; control is returned to the invoking OS, indicating Success or Failure.

2. NewDomain r constraints: r is a valid mapped page accessible to the current domain.

actions: a new domain is created; r is read, measured, decrypted and installed as the software for the new domain; since this takes time, a 'pending' response is given immediately; upon completion, an OS interrupt is raised indicating Success or Failure; when successful, returns the new color of the new domain.

3. Resume c constraints: only OS can invoke this primitive; c (c>1) is the color of a valid and executable secure-domain.

actions: if a secure domain is being executed currently, its state is saved; pc is set to the indicated domain and execution continues there; if the resumed domain is another acm, its current domain is resumed (recursively).

4. Map r, c constraints: only OS can invoke this primitive; r is a real address that is not currently mapped; c must be a valid color under this acm.

actions: page r will be erased and it will be mapped to color c;

since this takes time, a 'pending' response is given immediately; upon completion, an OS interrupt is raised indicating Success or Failure.

5. Unmap r, c constraints: only OS can invoke this primitive; r is a real address that must be currently mapped to color c.

actions: the page r will be unmapped and erased and can be reallocated for any domain later; if r happens to be shared, all sharers will lose access to that page; since this takes time, a 'pending' response is given immediately; upon completion, an OS interrupt is raised indicating Success or Failure.

6. Move r, c, c', dir constraints: r must have been mapped to c; c' must be a valid color and dir is 0 or 1.

actions: if dir is 0, c must be a secure-domain (with key k); r is encrypted using k and remapped to c'; if dir is 1, c' must be a secure-domain (with key k); r is decrypted using k and transferred to c'; since this takes time, a 'pending' response is given immediately; upon completion, an OS interrupt is raised indicating Success or Failure.

7. SwResp op, other params constraints: only acmSw can invoke this primitive; it indicates that the operation op is completed; Success or failure is notified.

actions: the remaining parameters are internal to acm, for storing in acmHw tables.

8. DirectExtInt intNum, c constraints: only acmSw can invoke this primitive; an interrupt vector is a map: from interrupt-number to acm-number; currently, the interrupt for intNum must be mapped to the executing acm; in the executing acm, c must be a valid color standing for a domain that is another acm.

actions: the mapping for intNum is changed to the acm that corresponds to c.

9. ExtInt intNum, other params constraints: issued by an external device during execution of any domain.

actions: if a secure domain is currently being executed, its state is saved; control is transferred to OS at a preset extIntAddress; in the corresponding domain the other parameters (from device) are passed on to the interrupt service routine.

10. Access r, rwx constraints: issued by any domain indicating an access (indicated by rwx) to page r; r must be a valid page mapped to some color c; the current palette must have an entry for color c, with compatible rwx permissions.

actions: the operation is permitted if the above checks pass correctly otherwise, an OS interrupt is raised indicating an access fault.

11. SysCall params constraints: issued by any domain indicating a service call with relevant parameters.

actions: if issued by a non-OS process, an OS interrupt is raised passing the parameters; if issued by OS, then it is reflected to a lower level acm (if one exists).

12. OwnerHandle r, rwx constraints: issued by a secure domain that wants to share one or more memory pages; the caller specifies the type of access (rwx) that it wants to give a sharer action: acm creates a new color and a new key for the memory pages, adds the new color to the palette of the caller and returns a handle for the memory that the caller can share with another secure domain.

13. SharerHandle handle constraints: issued by a secure domain to add the color for a shared memory segment to its palette.

action: adds the color to the caller's palette if this does not violate the constraints in the constraint matrix While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Another Exemplary Hardware Implementation

Figure 7:
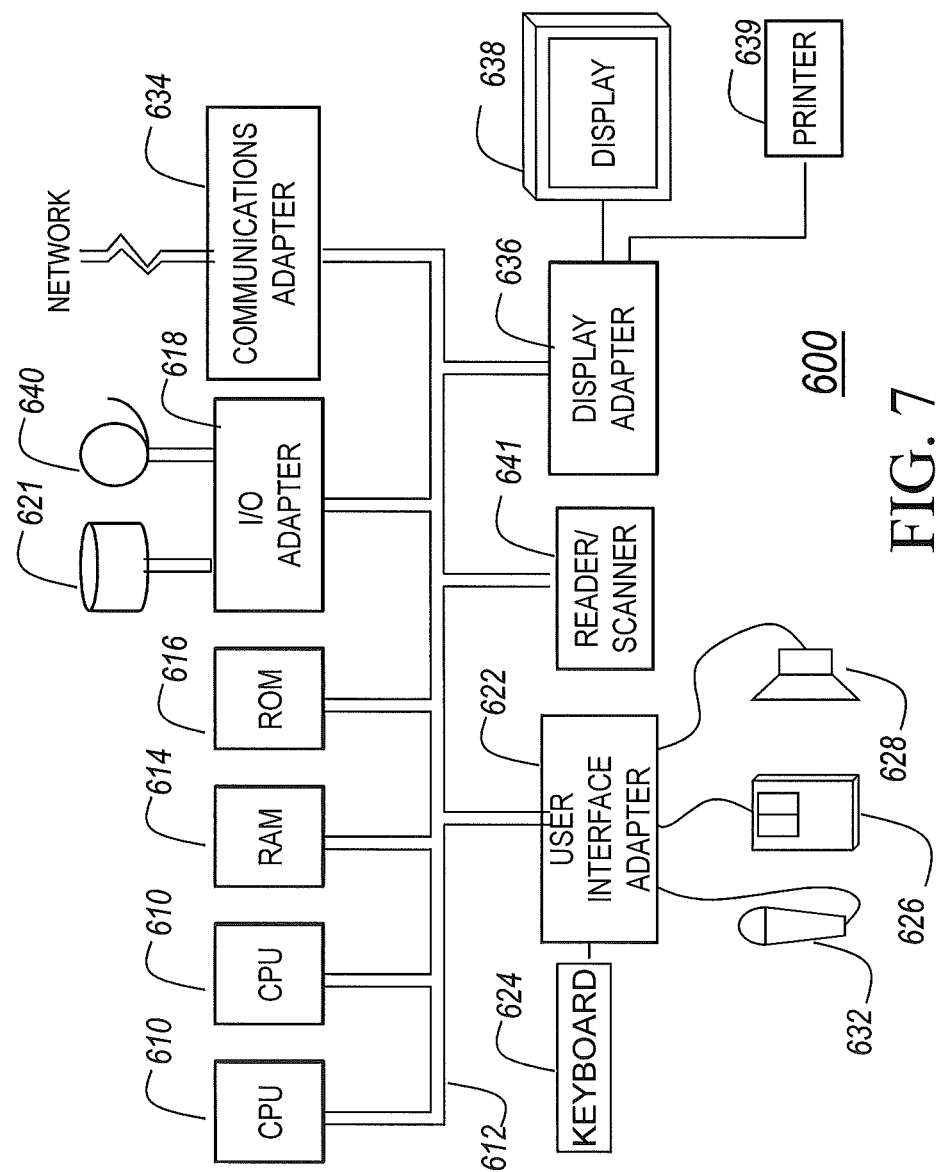
FIG. 7 illustrates an exemplary hardware/information handling system for incorporating the exemplary embodiment of the invention therein.

FIG. 7 illustrates another hardware configuration of an information handling/computer system 600 in accordance with the invention and which preferably has at least one processor or central processing unit (CPU) 610 that can implement the techniques of the invention in a form of a software program.

The CPUs 610 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 610 and hardware above, to perform the method of the invention.

This signal-bearing storage media may include, for example, a RAM contained within the CPU 610, as represented by the fast-access storage for example.

Figure 8:
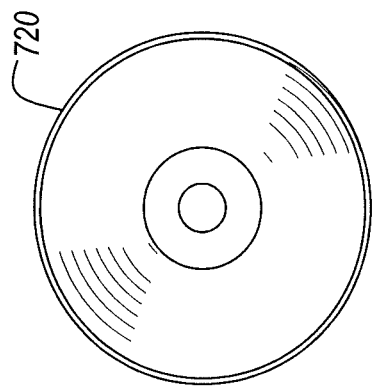
FIG. 8 illustrates a non-transitory signal-bearing storage medium for storing machine-readable instructions of a program that implements the method according to the exemplary embodiment of the invention.
Figure 8:
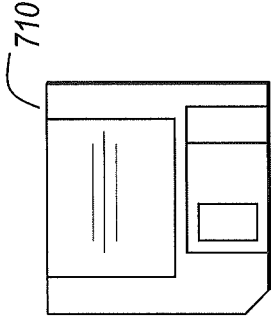

Alternatively, the instructions may be contained in another signal-bearing storage media 700, such as a magnetic data storage diskette 710 or optical storage diskette 720 (FIG. 8), directly or indirectly accessible by the CPU 610.

Whether contained in the diskette 710, the optical disk 720, the computer/CPU 610, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing storage media, including memory devices in transmission media, such as communication links and wireless devices, and in various formats, such as digital and analog formats. In an illustrative embodiment of the invention, the machine-readable instructions may comprise software object code.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer system, comprising:
   a mechanism supporting Secure Objects, wherein a Secure Object comprises information that is protected so that other software on said computer system cannot access or undetectably tamper with said information, thereby protecting both a confidentiality and an integrity of the Secure Object's information from other software while making the Secure Object's information available to the Secure Object itself during execution of the Secure Object, wherein said mechanism comprises:
   a processor in the computer system that includes memory protection hardware that prevents other software from accessing a Secure Object's information when said information is in a memory of the computer system; and
   an encryption and decryption mechanism that uses an encryption/decryption key that is not available to software that decrypts and integrity-checks Secure Object information as the Secure Object information moves into the computer system from an external storage system, and encrypts the Secure Object information and updates an integrity value for the information as the Secure Object information moves out of the computer system to an external storage system,
   wherein the Secure Object comprises information that is protected from other software on said computer system, the computer system, comprising a processor configured to protect memory pages of a Secure Object by:
     assigning a Secure Object an ID;
     labeling the memory pages of a Secure Object with the ID of the Secure Object;
     controlling access to memory pages by monitoring load and store instructions and comparing the ID of the software that is executing to the label on the memory page being accessed; and
     not allowing access when the ID does not match the label on the memory page.

2. The computer system of claim 1, wherein the memory protection mechanism uses labels to indicate the owner of a memory page.

3. The computer system of claim 1, wherein the memory protection mechanism uses storage protection keys as labels that indicate the owner of a memory page.

4. The computer system of claim 1, wherein the memory protection mechanism is based on adding ownership labels to a CPU's (Central Processing Unit) address translation mechanisms,
   wherein the mechanism supporting Secure Objects protects the state of a Secure Object when other software such as an operating system, hypervisor or interrupt handler interrupts the execution of a Secure Object, wherein an Access Control Monitor securely saves the state of the Secure Object before the interrupting software executes thereby protecting the CPU state of a Secure Object from other software.

5. The computer system of claim 1, wherein said processor comprises a mechanism to protect Virtual Machines and Individual Applications within Virtual Machines, said processor comprising:
a mechanism for supporting Secure Objects that have been constructed from Virtual Machines; and
a mechanism for supporting Secure Objects within a Virtual Machine.

6. The computer system of claim 1 that supports shared memory between two or more Secure Objects wherein the confidentiality and integrity of the shared memory is protected from the other software on the computer system, wherein the Secure Object comprises information that is protected from other software on said computer system, the computer system, comprising a processor configured to protect memory pages of a Secure Object by not allowing access when the ID does not match the label on the memory page.

7. The computer system of claim 6 that supports controlled sharing between Secure Objects based on at least one of classes, mandatory access controls and constraint matrices, and supports universal access classes, and
wherein the shared memory is decrypted by an Access Control Monitor.

8. The computer system of claim 1, wherein an encryption and decryption processing and an integrity processing to protect integrity of information is only performed when pages of information move between the memory and a storage device.

9. A computer system comprising:
a mechanism supporting Secure Objects, wherein a Secure Object comprises information that is protected so that other software on said computer system cannot access or undetectably tamper with said information, thereby protecting both a confidentiality and an integrity of the Secure Object's information from other software, said computer system comprising:
memory protection hardware that prevents other software from accessing information in a Secure Container when said information is in a memory of the computer system,
wherein the Secure Object comprises information that is protected from other software on said computer system, the computer system, comprising a processor configured to protect memory pages of a Secure Object by:
assigning a Secure Object an ID;
labeling the memory pages of a Secure Object with the ID of the Secure Object;
controlling access to memory pages by monitoring load and store instructions and comparing the ID of the software that is executing to the label on the memory page being accessed; and
not allowing access when the ID does not match the label on the memory page.

10. The processor of claim 9, wherein the software container is a LINUX container such as an LXC container or a Docker container.

\* \* \* \* \*